(No Model.)
C. SPRUCE.
APPARATUS FOR WHETTING AND SHARPENING THE CUTTING EDGES OF EDGE TOOLS, &c.
No. 471,679. Patented Mar. 29, 1892.
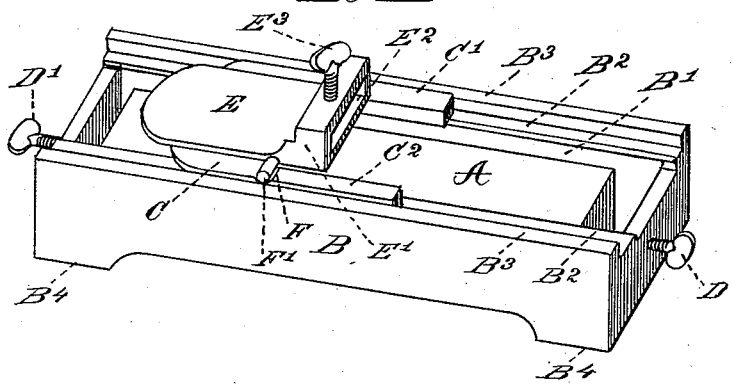
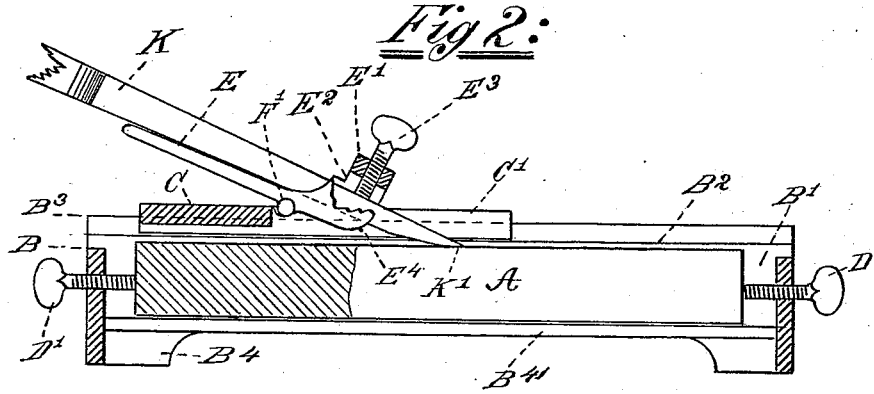
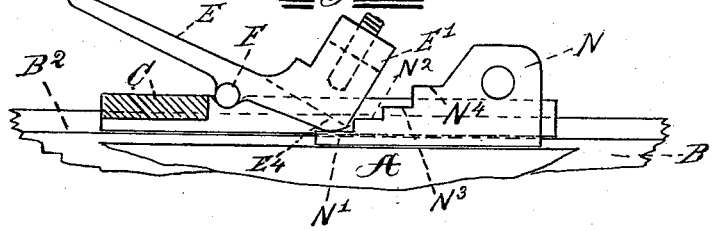
WITNESSES:
Richard A. Healy
John Johnson
INVENTOR:
Charles Spruce
By John F. Kerr
Attorney

UNITED STATES PATENT OFFICE.

CHARLES SPRUCE, OF PATERSON, NEW JERSEY.

APPARATUS FOR WHETTING AND SHARPENING THE CUTTING-EDGES OF EDGE-TOOLS, &c.

SPECIFICATION forming part of Letters Patent No. 471,679, dated March 29, 1892.

Application filed December 17, 1891. Serial No. 415,349. (No model.)

*To all whom it may concern:*

Be it known that I, CHARLES SPRUCE, of the city of Paterson, in the county of Passaic and State of New Jersey, have invented a new and useful Improvement in Apparatus for Whetting and Sharpening the Cutting-Edges of Edge-Tools, whereby the cutting-angle of the tool can be accurately formed and the face edge kept square and true; and I accomplish this object by the apparatus described in the following specification and illustrated in the accompanying drawings, in which—

Figure 1 is a perspective view of my invention, showing the frame or box with stone inserted ready for the introduction of an article to be sharpened. Fig. 2 is a longitudinal section through the box, showing a chisel-blade inserted and adjusted for sharpening. Fig. 3 is a part sectional view of a part of box or frame, showing the method of adjusting the angle to which the cutting-edge of a tool may be brought by the use of a gage.

I will now describe more fully the advantages obtained by the method of whetting or sharpening tools by the use of my newly-invented apparatus. By the means of the tool-holder firmly securing the tool to be operated upon, the angle required being adjusted by the use of the gage, a simple pressure of the point of the tool upon the whetstone and a reciprocatory motion given to the sliding carriage a keen edge, true in form and perfectly square with the body of the tool, may be rapidly and easily produced, which in the case of cutters for wood-working machines, tools for mortising-machines, and carpenters and pattern-makers' chisels is a matter of great importance, and in whetting the cutting-edges of chisels for cutting the teeth of files the accuracy of the angle of the cutting-edge of the tool is of the greatest moment, as the blow given to the chisel by the operator or machine imparts to the tooth of the file the same degree of angle that the chisel may be whetted to. This will be understood more fully when I mention that whetting the edge by hand on an oil or whetstone, however expert the operator, is apt to produce a rounded form to the cutting-edge, which, being reproduced in obverse by the operation of cutting the teeth on a file-blank, forms a weak and irregular tooth, which, when hardened and used as a cutting-tooth, breaks off, leaving the new file in nearly the same condition as the one that has been in use for a considerable time. The fact of the preservation of the truth of the angle of cut in wood-working machinery gives to the tool increased cutting power, as the different natures of the wood operated upon, whether hard or soft, require a more or less acute angle to the cutting-edges of the tools to perform rapid or perfect work; also, by the use of the different adjusting-screws the whetstone itself is worn equally and is kept true and flat, obviating the necessity of frequent regulating.

I will now describe the construction of my newly-invented device.

A represents an oil-stone or whetting-stone of the usual form inclosed in a box or frame B of a rectangular form, on the inner and longer sides B' of which are provided projecting ribs or flanges $B^{41}$, located near the bottom at a suitable height to allow for the thickness of the stone A, which rests upon them, Fig. 2. At each end of the frame or box B are provided set-screws or adjusting thumb-screws D D', which work in threads formed in the end of the frame to receive the same, and which clamp the stone A firmly in engagement with the box B, level and true. On the upper edges of the longer sides of the box B are formed parallel and level smooth slides $B^2$, the outer sides of which are provided with raised lips or guards $B^3$, which are also parallel with each other and at right angles with the surface $B^2$, upon which the tool-carriage C, with its extended portions C' $C^2$, traverse freely and accurately in a longitudinal direction when operated by the hand. About midway, or nearly where the extended portions C' $C^2$ commence, Figs. 1 and 2, are formed pivot-bearings F F on each side of its upper surface, and which are semicircular in form and in which the pivots F' F' of the tool post or holder E rests and partly revolves. The holder E is provided at its outer end with an enlarged and raised portion E', which has a rectangular opening through it in a longitudinal direction $E^2$, which permits the entrance or admittance of the tool to be operated upon; also, in the center of its upper side or top is located a thumb set-screw $E^3$, which works in thread-post E', Figs. 1, 2, and 3. The under side of the tool-holder E at its front end E⁴ is formed rounding or angular to allow very acute angles to be formed on the articles operated upon, Fig. 2. The gage N, Fig. 3, is a flat piece of steel cut in the form shown in Fig. 3, with a number of graduated steps N' N² N³ N⁴, formed on its upper edge and parallel to its under edge. The height and number of graduated steps correspond with the number of angles to be whetted or sharpened and the degree of their angle. At each corner on the bottom of the frame B are provided legs or feet B⁴ to allow the apparatus to stand level and firm on a bench or table without the liability of rocking or tipping. The box B, with its carriage and tool-holder, &c., is made preferably of cast-iron or steel, and the shape or form may be of any ornamental design to suit the taste.

I will now describe the operation of my newly-invented device. The stone A being inserted in the hollow space B' of the box B and resting upon the lips or flanges B⁴¹ B⁴¹, the end-adjusting screws D D' are screwed firm and tight, so as to hold the stone A true and level. The requisite angle being known to which the tool is to be whetted, the step N', N², or N³ which corresponds to that angle on the gage N is placed under the under side of the outer end E⁴ of the tool-holder E, the under edge of the gage N resting vertically on the stone A, the carriage C is held firmly and the tool-holder tipped until the end E⁴ rests upon the gage-step N' or N³, as requisite, Fig. 3. The tool to be whetted is then inserted in the opening E² in the post E', and the thumb-screw E³ securely tightened, holding the tool in position shown in Fig. 2. The gage N is then removed and the apparatus is ready for use. In whetting the edge K' of the tool K the operation is performed by moving the carriage C, with the guides C' C² and tool-holder E, with its various parts, backward and forward in the slides B² B² and lips B³ B³, keeping the front or cutting edge K' of the tool K in firm engagement with the stone A by tipping the tool-holder E, which rocks on its pivots F' F'. The progress of the operation can be easily examined by allowing the holder E to fall flat on the carriage C, as in Fig. 1, or by lifting the tool-holder, with its contents, entirely out of and away from the rest of the parts.

With this description of my invention, what I claim is—

An adjustable whet or oil stone frame B in which is secured a whet or oil stone A and adjusted in a proper position a tool-holder E, which is pivoted upon a sliding carriage C by pivots F' and sliding in slides B² B², formed to receive it on the upper surface of the frame B, tool-holder E', with its opening E² and set-screw E³, beveled edge E⁴, adjustable by the gage N, with its graduations N' N² N³ N⁴, gage N, resting upon the face or upper surface of the whetstone A, and beveled part E⁴ of tool-post E, resting upon one of the graduations of the gage N, whereby any desired cutting-angle may be given to a cutting or edge tool that may be secured in the tool-post E' by the set-screw E³, substantially as and for the purposes specified.

CHARLES SPRUCE.

Witnesses:
JOHN JOHNSON,
JOHN W. GRIGGS.